US007735786B2

(12) United States Patent
Roberts

(10) Patent No.: US 7,735,786 B2
(45) Date of Patent: Jun. 15, 2010

(54) TEMPORARY SUPPORT STRUCTURE FOR USE WHEN INSTALLING OR REMOVING COMPONENTS

(76) Inventor: Neil Andrew Roberts, 11 Magdalen Place, College Grove Western Australia, 6230 (AU)

( * ) Notice: Subject to any disclaimer, the term of this patent is extended or adjusted under 35 U.S.C. 154(b) by 205 days.

(21) Appl. No.: 11/886,825

(22) PCT Filed: Mar. 24, 2006

(86) PCT No.: PCT/AU2006/000393

§ 371 (c)(1),
(2), (4) Date: Oct. 2, 2007

(87) PCT Pub. No.: WO2006/099679

PCT Pub. Date: Sep. 28, 2006

(65) Prior Publication Data

US 2009/0026325 A1 Jan. 29, 2009

(30) Foreign Application Priority Data

Mar. 24, 2005 (AU) .............................. 2005901445

(51) Int. Cl.
*E21F 17/02* (2006.01)
*F16L 3/00* (2006.01)

(52) U.S. Cl. .......................... 248/62; 248/318; 248/324

(58) Field of Classification Search .................. 248/62, 248/58, 317, 324, 318, 610, 581, 589; 138/106, 138/107

See application file for complete search history.

(56) References Cited

U.S. PATENT DOCUMENTS

| | | | | | |
|---|---|---|---|---|---|
| 2,524,916 | A | * | 10/1950 | Loos | 269/97 |
| 3,194,590 | A | * | 7/1965 | Cook | 285/61 |
| 3,647,171 | A | * | 3/1972 | Rafferty | 248/231.85 |
| 4,640,480 | A | * | 2/1987 | Semedard et al. | 248/62 |
| 5,699,991 | A | * | 12/1997 | Melinyshyn | 248/332 |
| 5,779,210 | A | * | 7/1998 | Canson et al. | 248/318 |
| 5,893,253 | A | * | 4/1999 | Lutz, III | 52/695 |

FOREIGN PATENT DOCUMENTS

| | | |
|---|---|---|
| DE | 20304317 | 7/2003 |
| JP | 10311458 | 11/1998 |

* cited by examiner

*Primary Examiner*—Anita M King
(74) *Attorney, Agent, or Firm*—Gottlieb, Rackman & Reisman

(57) ABSTRACT

A temporary load support intended in use to be supported from a fixed structure (10) to temporarily support an element (50) of the fixed structure, said load support comprising a pair of mountings (11) configured to, in use, be mounted to the fixed structure at spaced locations adjacent the element, a load bearing member (17) adapted to be fixed between the mountings, the load bearing member having a support element (23) located intermediate the mountings, wherein in use the mountings are fixed to the fixed structure proximate the element such that the support element is located in the region of the element, said support element being able to support the element.

19 Claims, 6 Drawing Sheets

TEMPORARY SUPPORT STRUCTURE FOR USE WHEN INSTALLING OR REMOVING COMPONENTS

FIELD OF THE INVENTION

The invention relates to a support which is intended to be used in association with a fixed structure in order to be able to temporarily support an element of the fixed structure during its installation and/or removal from the structure.

BACKGROUND ART

One particular application of the invention relates to use in association with ductwork or piping where it become necessary to service an element in such ductwork or piping. Such servicing generally requires the removal of the element from the ductwork or piping and then subsequent reinstallation of the serviced item or installation of a replacement item. In most cases the most common means for removal or placement of such items comprises the use of a crane and whilst this can be convenient during the construction phase of a plant it is not so convenient once the plant is operating and in fact may not be possible due to the location of the element to be removed and the site.

A particular application of the invention relates to use with flanged pipes which are interconnected through their flanged connections and/or which accommodate flow control or sensing elements through their flanged connections.

The discussion throughout this specification and claims, of the background and prior art to the invention is intended only to facilitate an understanding of the present invention. It should be appreciated that the discussion is not an acknowledgement or admission that any of the material referred to was part of the common general knowledge in Australia and the world as at the priority date of the application.

DISCLOSURE OF THE INVENTION

Throughout the specification and claims, unless the context requires otherwise, the word “comprise” or variations such as “comprises” or “comprising”, will be understood to imply the inclusion of a stated integer or group of integers but not the exclusion of any other integer or group of integers.

Accordingly, the invention resides in a temporary load support intended in use to be supported from a fixed structure to temporarily support an element of the fixed structure, said load support comprising a pair of mountings configured to, in use, be mounted to the fixed structure at spaced locations adjacent the element, a load bearing member arranged and configured to be fixed between the mountings, wherein the load bearing member comprises a pair of elongate struts which are pivotally interconnected at one end and which are arranged and configured to be mounted at their free ends to the mountings, the load bearing member having a support element located intermediate the mountings, at the interconnection between the elongate struts and comprising the pivotal connection between the elongate struts, the support element comprising a spigot element extending transversely from the load bearing member, wherein in use the mountings are fixed to the fixed structure proximate the element such that the support element is located in the region of the element, said support element being able to support the element.

According a preferred feature of the invention the support element is capable of supporting the element through a lifting device.

A temporary load support as claimed at any one of the preceding claims wherein the mountings comprise the ends of the load bearing member.

According a preferred feature of the invention the ends of the load bearing member are separable form the mountings.

According a preferred feature of the invention the mountings are pivotally mounted at each end of the load bearing member.

According a preferred feature of the invention each mounting comprises a body having a first spigot extending transversely from one face and associated with an opposed surface which is substantially parallel to the spigot and which defines a space between the opposed face and the first spigot.

According a preferred feature of the invention a bearing member is supported from the opposed face and is in opposed relation to the first spigot across the space, the bearing member being arranged and configured to clampingly engage a portion of the fixed structure received in the space.

According a preferred feature of the invention the fixed structure includes a flanged connection between the fixed structure and the element and wherein the mounting is intended in use to engage a flange of the fixed structure and which in part defines a flanged interconnection of the fixed structure with the element, where the flanges are formed with an array of apertures adjacent their perimeter, at least some of said apertures being interconnected by fixing means to clampingly retain the flanges in engagement, the first spigot of the mountings being dimensioned to be receivable with in an aperture of the flange and the bearing member being arranged and configured to bear upon the outer radial edge of the flange in diametrically opposed relation to the aperture.

According a preferred feature of the invention each mounting further comprises a second spigot extending from the opposite face which is opposite the one face of the mounting, the second spigot being arranged and configured to be received within an aperture provided in the load bearing member.

The invention will be more fully understood in the light of the following description of several specific embodiments.

BRIEF DESCRIPTION OF THE DRAWINGS

The description is made with reference to the accompanying drawings of which.

DETAILED DESCRIPTION OF SPECIFIC EMBODIMENT

Figure 1:
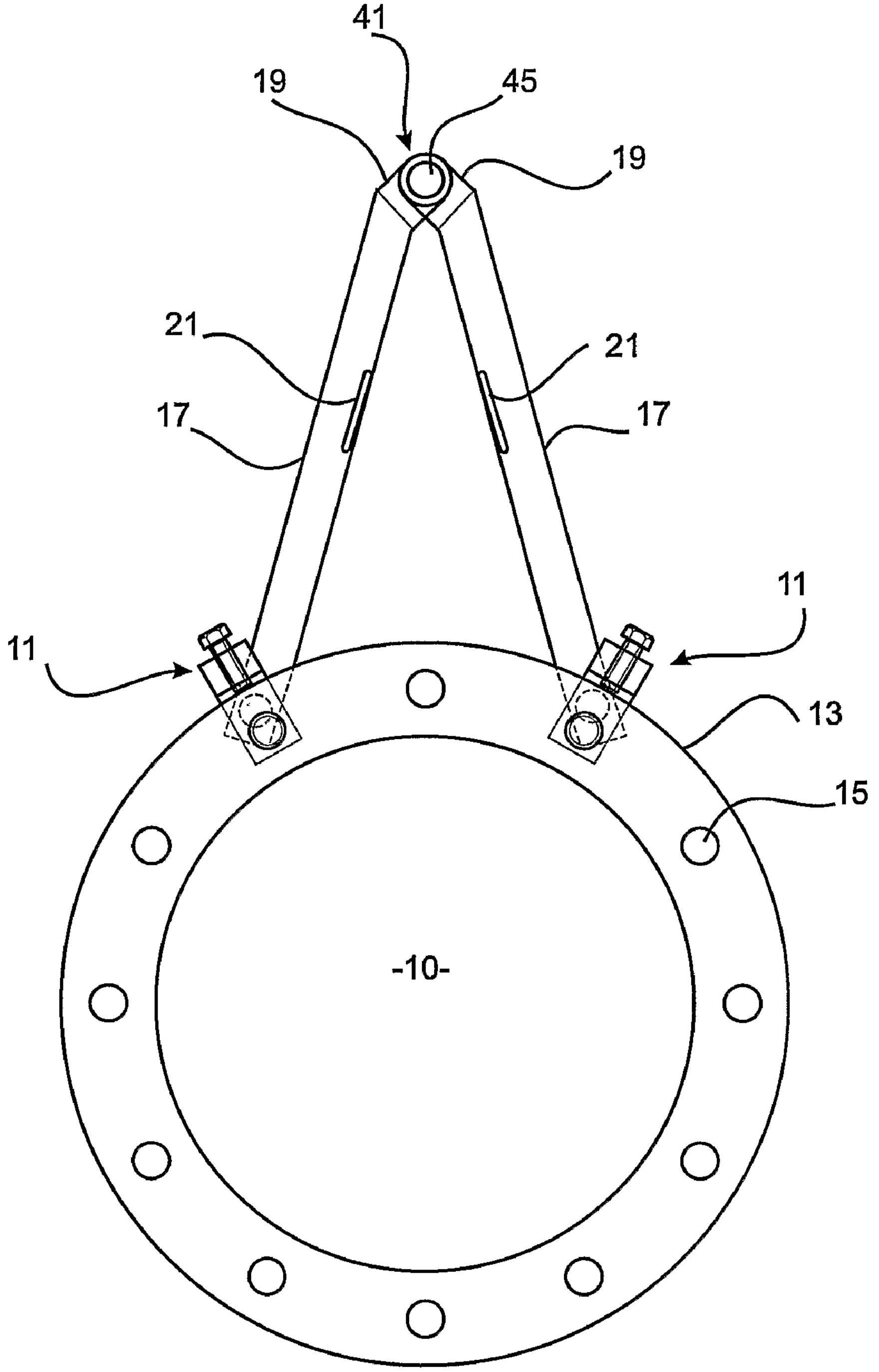
FIG. 1 is a schematic end elevation of a flanged pipe supporting a temporary load support according to the first embodiment.
Figure 2:
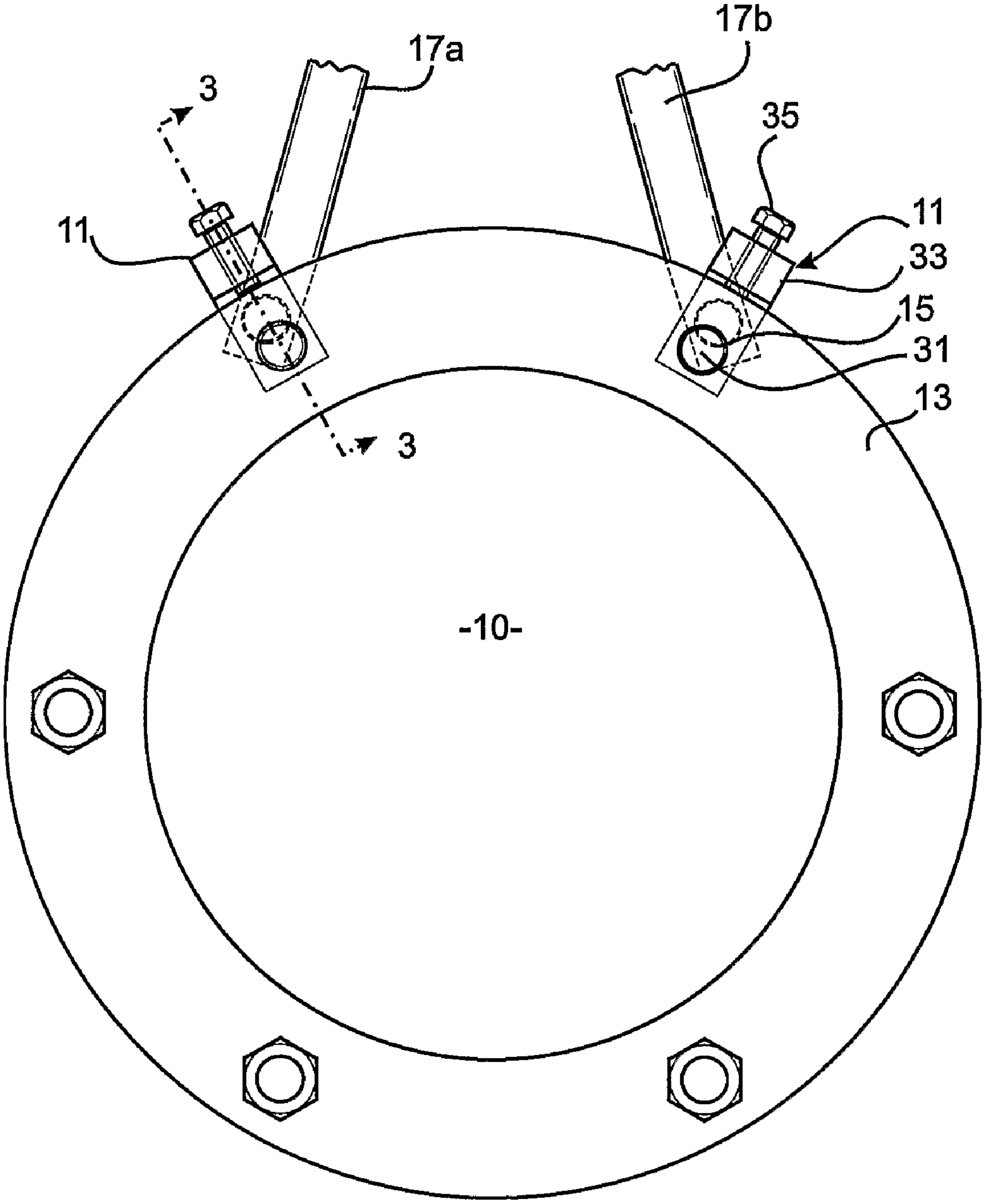
FIG. 2 is an enlarged view illustrating the mounting of FIG. 1.
Figure 3:
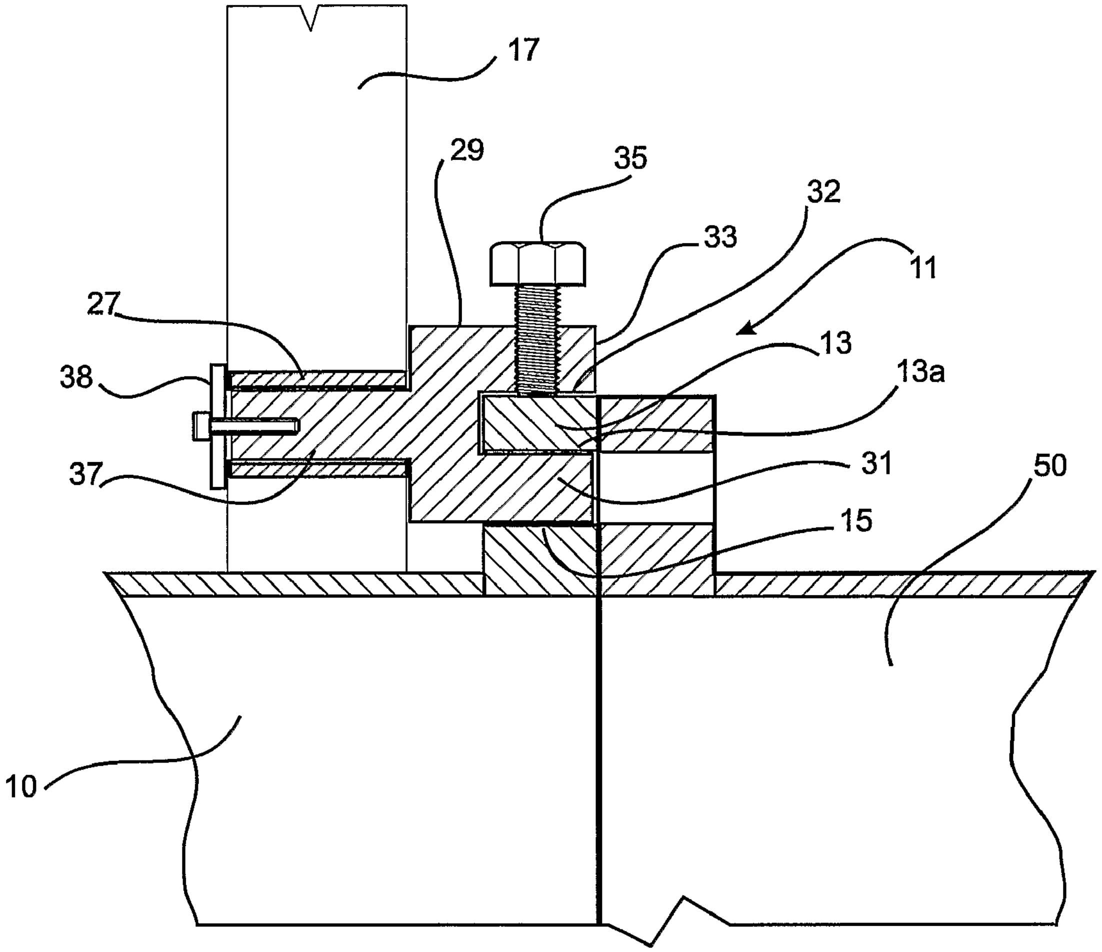
FIG. 3 is a section view along the line 3-3 of FIG. 2.
Figure 4:
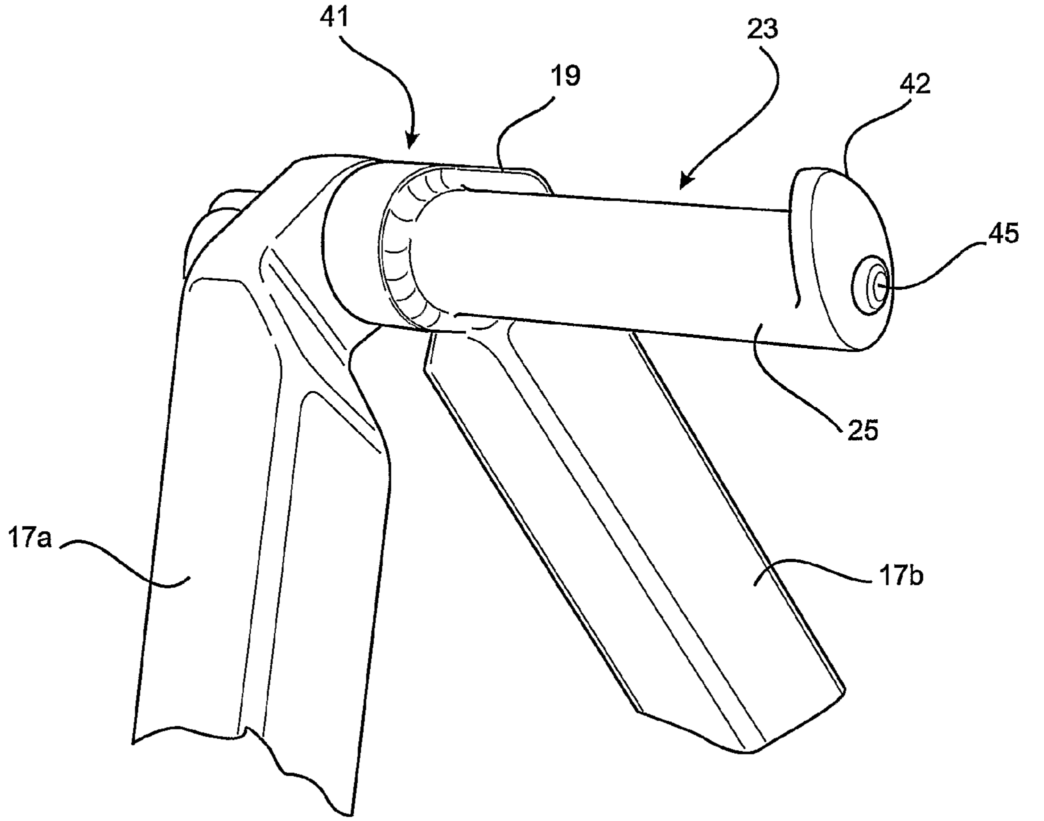
FIG. 4 is an isometric view of the support element of the first embodiment.
Figure 5:
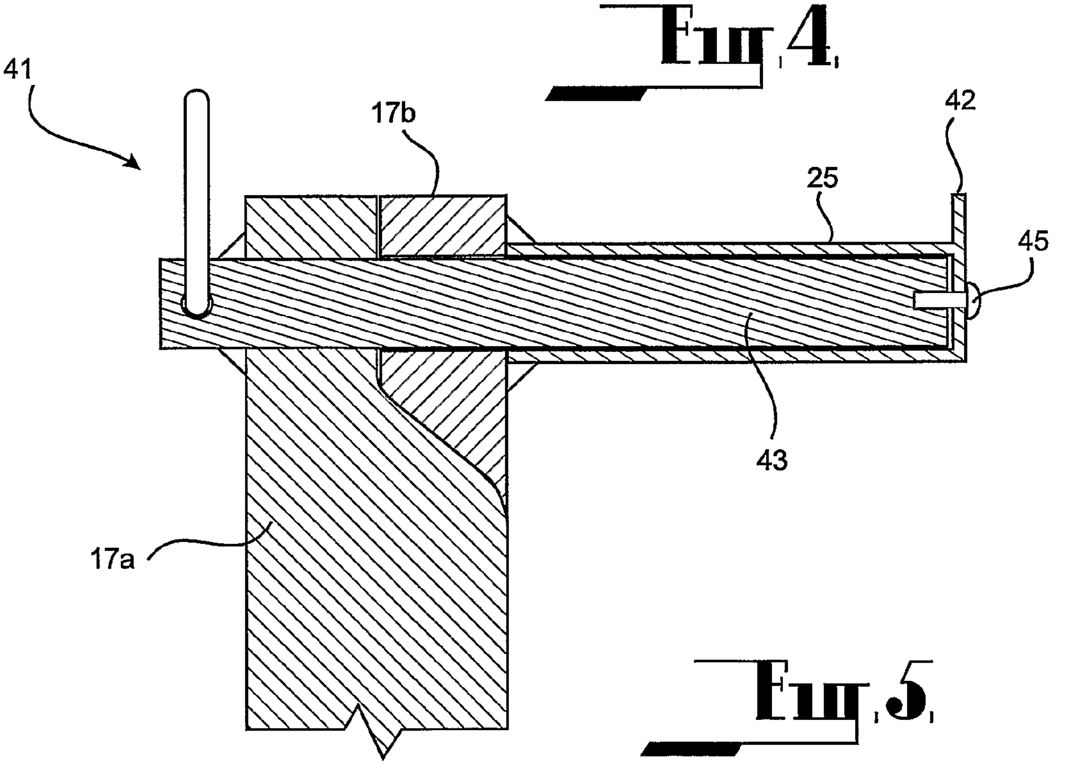
FIG. 5 is a sectional view of the interconnection between the struts according to the first embodiment.

The first embodiment as illustrated at the accompanying FIGS. 1 to 5, comprises a temporary load support which is intended to be used in relation to an element of ductwork to enable removal and/or replacement of the element or the servicing of the element. For example where the element comprises a valve which is located in a length of pipe the embodiment provides a means of supporting the valve or a component of the valve (e.g. the top assembly) while the valve or component is being disconnected and to enable removal of the element from the ductwork and the replacement of the element into the ductwork.

In mineral processing plants, chemical plants and the like it is usual practice to convey fluids by means of pipes which comprise lengths of pipe having flanges at each end and where the lengths of pipes are interconnected by clampingly engaging the flanges of adjacent pipes together. In addition, fluid flow control elements such as valves and the like are located in position within such duct work and are interconnected into the duct work by use of suitable flanged interconnections. The flanged interconnections comprise a flange on each element where each flange is provided with a corresponding array of apertures which in use are interconnected by fixing bolts or the like to clampingly hold the flanges together. When it becomes necessary to disconnect a length of pipe or an element from an existing body of pipe work it is necessary to support the element which is being removed during the disengagement of the bolts which retain the element in position and to support the element as it is removed from the pipe work. Similarly it is necessary to support a new element whilst it is being located in position in the pipe work. During construction of a plant this can be easily effected by means of cranes or like lifting means, however, once the construction phase has finished, and it becomes necessary to remove or relocate an element it is inconvenient to require a crane to be reintroduced into the site for that purpose. In addition in many cases the use of crane is inappropriate due to the inaccessibility of the element.

It is an object of the first embodiment to provide a temporary load support which can be fixed to the existing pipe work and which can be used to support an element during its location and removal from the pipe work.

The temporary load support comprises a pair of mountings 11 which are to be supported from the flange 13 of a pipe 10. The flange 13 is provided with a circular array of apertures 15 at least some of which are used to clampingly engage the flange with the flange of another length of pipe or an element through suitable fixing bolts.

In use the mountings 11 are intended to be received in a pair of spaced apertures 15 of the flange 13. Each of the mountings 11 is associated with an elongate strut 17 and the struts are pivotally interconnected at one end 19 through a pivot 41. The free ends of the struts 17 are pivotally mounted to the mountings 11.

In addition each of the strut members 17 are provided with a handle 21 intermediate of their length which are intended to be used by a user to facilitate their transportation and the manipulation of the support means as required.

The pivot 41 between the struts also provides a support element 23.

The pivot 41 between the struts comprises a rod member 43 which extends from the side face of one of the struts 17*a* and which is slidably and rotatably received within a tubular member 25 on the other strut member 17*b* and which extends from the opposite side face of the other strut member 17*b* such that the rod member of the one strut 17*a* is pivotally received within the outer tube member 25 of the other strut member 17*b*. In addition the interaction of the rod member 43 with the tubular member 25 serves to reinforce the support element. The outer end of the outer tube 25 is provided with an abutment 42 to prevent lateral displacement from the tubular support of an item supported thereby. The rod shaped member 43 is retained within the outer tube member 25 through a threaded locking stud 45 which is received through an aperture provided in the outer end of the tubular support and is threadably engaged in a threaded bore in the outer end of the rod member 43.

The free end of each strut 17 is provided with an aperture 27.

The mountings 11 each comprise a central web 29. One face of the web 29 is provided with a first spigot 31 which extends transversely from the web 29 and the first spigot has a diameter which is substantially complementary to the aperture 15 in the flange 13. The length of the first spigot 31 is less than the thickness of the flange 13 such that the first spigot 31 will not extend fully through the aperture 15. The web 29 is also associated with an abutment portion 33 which is generally parallel with the first spigot 31 to define a space 32 between the abutment 33 and the first spigot 31. The abutment 33 threadably supports a clamping member 35 which is threadably received within the abutment member 33 to extend through the abutment member and into opposed relation with the first spigot 31. The space 32 between the abutment portion 33 and the first spigot 31 is dimensioned such that it is able to receive the portion 13*a* of the flange 13 between the aperture 15 and the outer radial edge of the flange 13. The web 29 of each mounting further supports a second spigot 37 which extends from the other face of the web in generally opposed relation to the first spigot 31. The second spigot 37 is dimensioned to be pivotably received within the aperture 27 provided at the free end of the respective strut member 17. A retention plate 38 is provided for releasably retaining the second spigot 37 in the aperture 27.

In use, a set of pairs of mountings 11 may be required to accommodate for situations where the apertures 15 in the flanges 13 and the spacing between the apertures 15 and the outer radial edge of the flanges differ.

In use, when it becomes necessary to remove an element 50 from a length of pipe work 10, a pair of mountings 11 are located in angularly spaced apertures 15 around the flange 13 at the side of the flange connection remote from the element 50. To take this action the bolts (if they are present) which are normally located within those apertures are removed before the mounting member is located in position. Once the mountings 11 are in position, the clamping member 35 is brought into locking engagement with the flange 13 such that the mountings are positively located in position on the flange. With the mountings 11 in position, the struts 17 are then located over the second spigots 37 of the mountings. When the struts 17 are in position, the support element 23 extends laterally from the load bearing member in the direction of the element 50. The element 50 can then be supported from the support element 23 through a suitable lifting arrangement such as block and tackle which enables the element to be extracted from the pipe work and lowered to the ground or floor or like support. In addition the temporary load support can be retained in position and used to effect the replacement of the element or to enable the element to be relocated into position.

In use, the temporary load support according to the embodiment can be mounted to the pipe work such that the support element 23 is located to one side of the pipe work rather than above the pipe work as shown in the attached drawings. In this regard the angular disposition of the support element relative to the structure from which is supported can comprise any position that is desired to provide the desired support for the item to be engaged.

In addition, the temporary load support according to the embodiment need not be restricted to the situation where the mountings are to be supported from the flanges of the pipe work since the mountings can also be mounted to the supporting structure associated with the pipe work and located such that the support 23 is located above or to one side of the element to be removed or supported. A suitable supporting structure can comprise one formed from channel sections or I beam sections or strip sections or any structural element which provides a flange or the like which can be received in the space between the first spigot 31 and the abutment 33 of the mountings.

Furthermore the temporary load support of the first embodiment may be used in combination with other similar temporary load supports to jointly provide the desired support for an item.

Figure 6:
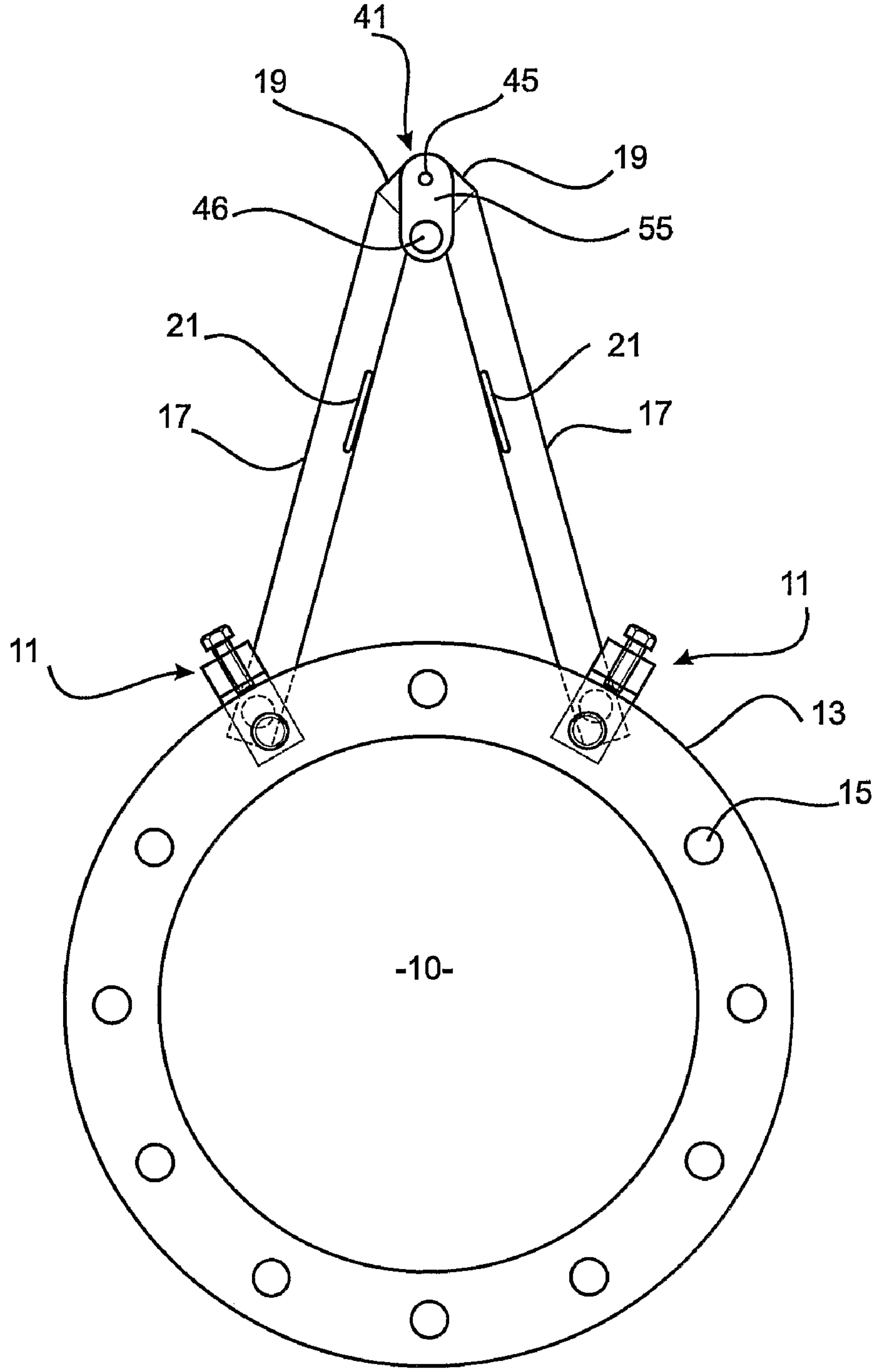
FIG. 6 is a schematic end elevation of a flanged pipe supporting a temporary load support according to the second embodiment.
Figure 7:
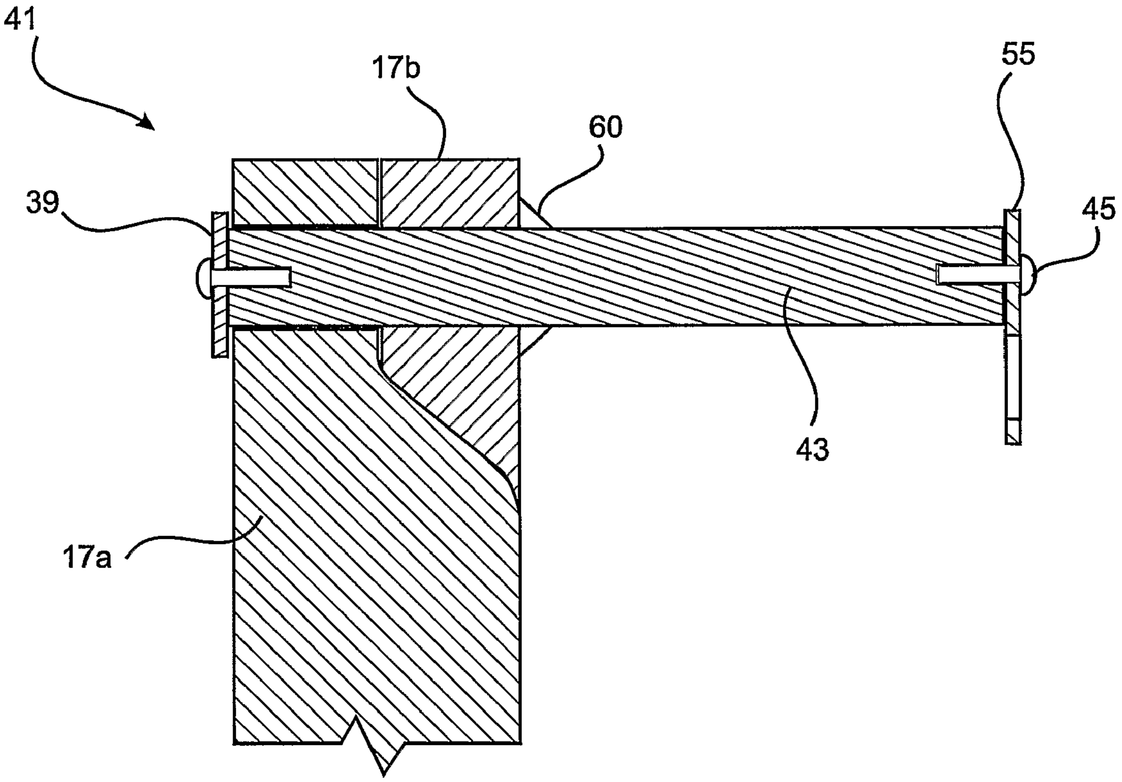
FIG. 7 is a sectional view of the interconnection between the struts according to the second embodiment.

FIGS. 6 and 7 represent a second preferred embodiment, which is substantially the same as the first embodiment and so corresponding numerals are used to identify similar parts.

In this embodiment, the pivot 41 between the struts 17 comprises a rod member 43 which is fixedly attached through one of the struts 17*b* and which is slidably and rotatably received within the other strut member 17*a*, such that the rod member of 17*b* is pivotably received by the member 17*a*. In this embodiment the rod member 43 is fixed to strut 17*b* by being welded thereto at fillet weld 60 and/or accommodated by a press fit.

The near end of the rod member 43 accommodates a retention plate 39 by an appropriate fastening means, which maintains the proximal relationship between the struts 17 on the pivot 41.

The outer end of the rod member 43 is provided with a lifting plate 55 attached by means of a threaded locking stud 45 which is received through an aperture in the lifting plate 55 and is threadably engaged in a threaded bore in the outer end of the rod member. The lifting plate 55 incorporates an attachment means such as a hole 46. The lifting plate 55 is rotatably mounted on the rod member 43 to facilitate the alignment of the attachment means 46 for attachment to an appropriate lifting means, such as a block and tackle having a lifting hook which can engage the hole 46.

The outer end of the rod member 43 can be provided with alternative attachment means to engageably receive an appropriate lifting means such as a block and tackle.

It should be appreciate that the scope of the present invention need not be limited to the particular scope of the embodiments described above.

The claims defining the invention are as follows:

1. A temporary load support intended in use to be supported from a fixed structure to temporarily support an element of the fixed structure, said load support comprising a pair of mountings configured to, in use, be mounted to the fixed structure at spaced locations adjacent the element, a load bearing member arranged and configured to be fixed between the mountings, wherein the load bearing member comprises a pair of elongate struts which are pivotally interconnected at one end and which are arranged and configured to be mounted at their free ends to the mountings, the load bearing member having a support element located intermediate the mountings at the interconnection between the elongate struts and comprising the pivotal connection between the elongate struts, the support element comprising a spigot element extending transversely from the load bearing member, wherein in use the mountings are fixed to the fixed structure proximate the element such that the support element is located in the region of the element, said support element being able to support the element.

2. A temporary load support as claimed at claim 1 wherein the support element is capable of supporting the element through a lifting device.

3. A temporary load support as claimed at claim 1 wherein the mountings comprise the ends of the load bearing member.

4. A temporary load support as claimed claim 1 wherein the ends of the load bearing members are separable from the mountings.

5. A temporary load support as claimed at claim 4 wherein the mountings are pivotally mounted at each end of the load bearing member.

6. A temporary load support as claimed at claim 1 wherein each mounting comprises a body having a first spigot extending transversely from one face and associated with an opposed face which is substantially parallel to the first spigot, and which defines a space between the opposed face and the first spigot.

7. A temporary load support as claimed at claim 6 wherein a bearing member is supported from the opposed face and is in opposed relation to the first spigot across the space, the bearing member being arranged and configured to clampingly engage a portion of the fixed structure received in the space.

8. A temporary load support as claimed at claim 6 wherein the fixed structure includes a flanged connection between the fixed structure and the element and wherein the mountings are intended in use to engage a flange of the fixed structure and which in part defines a flanged interconnection of the fixed structure with the element, where the flange is formed with an array of apertures adjacent their perimeter, at least some of said apertures being interconnected by fixing means to clampingly retain the flanges in engagement, the first spigot of the mountings being dimensioned to be receivable with in an aperture of the flange and the bearing member being arranged and configured to bear upon the outer radial edge of the flange in diametrically opposed relation to the aperture.

9. A temporary load support as claimed at claim 8 wherein the first spigot has a depth which is less than the depth of the aperture.

10. A temporary load support as claimed at claim 6 wherein each mounting further comprises a second spigot extending from the opposite face which is opposite the one face of the mounting, the second spigot being arranged and configured to be received within a aperture provided in the load bearing member.

11. A temporary load support as claimed at claim 7 wherein the fixed structure includes a flanged connection between the fixed structure and the element and the mountings are intended in use to engage a flange of the fixed structure and which in part defines the flanged interconnection of the fixed structure with the element, where the flange is formed with an array of apertures adjacent its perimeter, at least some of said apertures being interconnected by fixing means to clampingly retain the flange in engagement, the first spigot of the mountings being dimensioned to be receivable within an aperture of the flange and the bearing member being arranged and configured to bear upon the outer radial edge of the flange in diametrically opposed relation to the aperture.

12. A temporary load support as claimed at claim 11 wherein the first spigot has a depth which is less than the depth of the aperture.

13. A temporary load support as claimed at claim 7 wherein each mounting further comprises a second spigot extending from the opposite face which is opposite the one face of the mounting, the second spigot being arranged and configured to be received within a aperture provided in the load bearing member.

14. A temporary load support as claimed at claim 8 wherein each mounting further comprises a second spigot extending from the opposite face which is opposite the one face of the mounting, the second spigot being arranged and configured to be received within a aperture provided in the load bearing member.

15. A temporary load support as claimed at claim 9 wherein each mounting further comprises a second spigot extending from the opposite face which is opposite the one face of the mounting, the second spigot being arranged and configured to be received within a aperture provided in the load bearing member.

16. A temporary load support as claimed at claim 11 wherein each mounting further comprises a second spigot extending from the opposite face which is opposite the one face of the mounting, the second spigot being arranged and configured to be received within a aperture provided in the load bearing member.

17. A temporary load support as claimed at claim 12 wherein each mounting further comprises a second spigot extending from the opposite face which is opposite the one face of the mounting, the second spigot being arranged and configured to be received within a aperture provided in the load bearing member.

18. A temporary load support intended in use to be supported from a fixed structure to temporarily support an element of the fixed structure, said load support comprising a pair of mountings configured to, in use, be mounted to the fixed structure at spaced locations adjacent the element, a load bearing member adapted to be fixed between the mountings, the load bearing member having a support element located intermediate the mountings, wherein in use the mountings are fixed to the fixed structure proximate the element such that the support element is located in the region of the element, said support element being able to support the element, wherein each mounting comprises a body having a first spigot extending transversely from one face and associated with an opposed face which is substantially parallel to the spigot and which defines a space between the opposed face and the first spigot, wherein the fixed structure includes a flanged connection between the fixed structure and the element and wherein the mountings are intended in use to engage a flange of the fixed structure and which in part defines a flanged interconnection of the fixed structure with the element, where the flange is formed with an array of apertures adjacent their perimeter, at least some of said apertures being interconnected by fixing means to clampingly retain the flanges in engagement, the first spigot of the mountings being dimensioned to be receivable with in an aperture of the flange and the bearing member being arranged and configured to bear upon the outer radial edge of the flange in diametrically opposed relation to the aperture.

19. A temporary load support as claimed at claim 18 wherein a bearing member is supported from the opposed face and is in opposed relation to the first spigot across the space, the bearing member being arranged and configured to clampingly engage a portion of the fixed structure received in the space.

* * * * *